Figure 1:
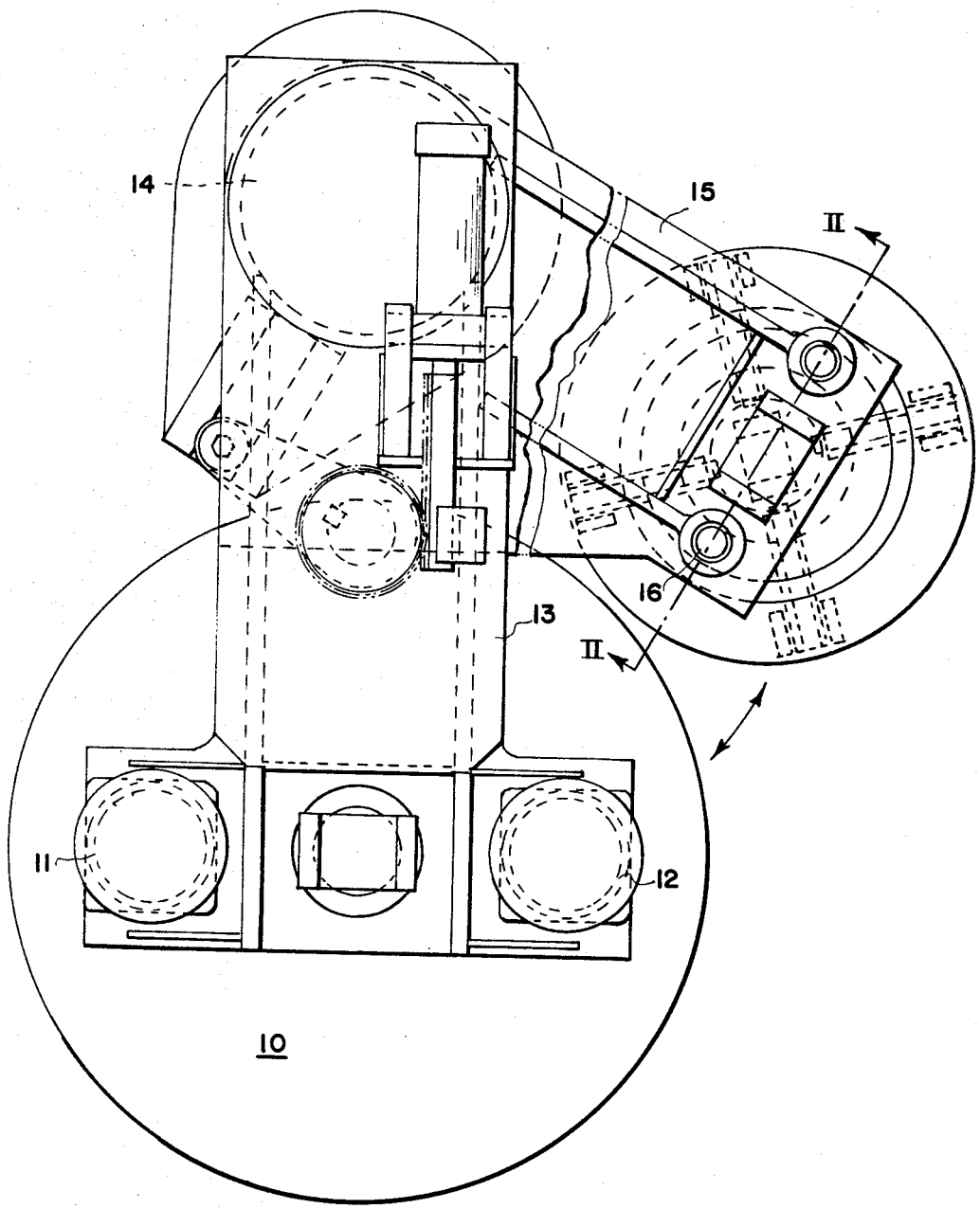

INVENTOR.
CLYDE I. PELTON

July 30, 1968 C. I. PELTON 3,394,580
FORMING MACHINE WITH WORK HANDLING DEVICE
Filed April 20, 1966 2 Sheets-Sheet 2

INVENTOR.
CLYDE I. PELTON
BY
*Francis J. Klempay*
ATTORNEY

United States Patent Office 3,394,580
Patented July 30, 1968

3,394,580
FORMING MACHINE WITH WORK HANDLING DEVICE
Clyde I. Pelton, Warren, Ohio, assignor to The Taylor-Winfield Corporation, Warren, Ohio, a corporation of Ohio
Filed Apr. 20, 1966, Ser. No. 543,970
10 Claims. (Cl. 72—361)

This invention relates to a machine for forming cylindrical sheet metal objects, and more particularly to the association with such equipment of an improved arrangement for feeding raw blanks into the forming station and withdrawing formed objects therefrom. The principal object of the invention is to provide a composite machine of this nature which is substantially automatic in operation and capable of a high rate of production with the capability of receiving a raw blanks and depositing the formed objects from or on a conveyor or conveyors which is or are positioned to one side of the forming station and free and clear of the same to provide maximum access to the essential components of the composite equipment.

Another and more specific object of the invention is the provision of an improved handling device for use in apparatus of the general character outlined above which is operative in each cycle of its movement to feed a new blank into the forming station and upon retraction to withdraw a completed or formed object from the station. In this connection, the forming equipment to which the handling apparatus of the invention is particularly adaptable is of the expanding type by which a cylindrical blank is stretched radially outward and thus increased in internal diameter. Further, the expanding mandrel or other device used to form the product is axially retractable from the female die in which the product was formed so that upon such retraction the handling equipment of the invention is enabled in a forward stroke to insert the new blank in the previously formed object, depositing the same in the forming station, and during the reverse stroke withdrawing the previously formed object from the forming station.

The above and other objects and advantages of the invention will become apparent upon consideration of the following specification and to the accompanying drawing wherein there is disclosed a preferred embodiment of the invention.

Figure 2:
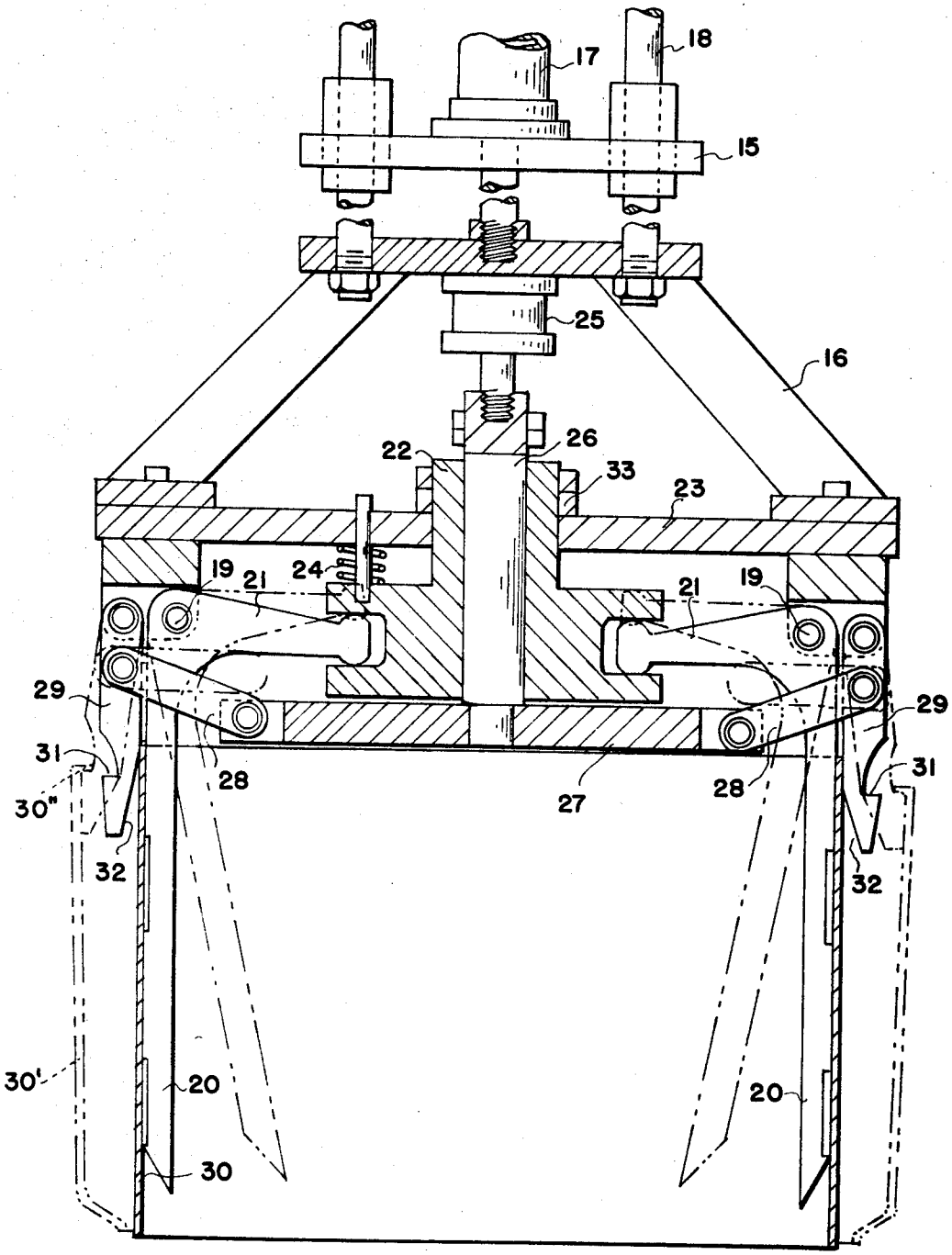

In the drawing:

FIGURE 1 is a plan view, in schematic outline, of a combined forming machine and workpiece handling apparatus therefor constructed in accordance with the principles of this invention; and FIGURE 2 is a partial vertical section taken along the line II–II of FIGURE 1.

At the outset, it should be noted that the apparatus of this invention and the present application is intended to be used with an expanding-bladder type of forming machine as more specifically illustrated in my copending application Ser. No. 544,006, filed Apr. 20, 1966. In such equipment a cylindrical sheet metal blank is lowered into an annular forming die after which a yieldable sleeve or bladder is lowered into the blank and high fluid pressure is applied to expand the side wall of the blank into close conformity with the shape of the die. To contain the large expansive forces encountered, the die is received in a heavy cylindrical holder which is shown schematically at 10 in FIGURE 1.

Supporting the assembly of the expansible sleeve or bladder which is more fully shown in the above referenced copending application are a pair of double-acting cylinders 11 and 12 which, of course, permits the said assembly to be lowered and raised into and out of the die which is contained within holder 10. These cylinders 11 and 12 are carried by an arm 13 which is cantilevered outwardly from a vertically disposed column 14, the arm 13 being supported by and swivelled on the column 14. Rigidly connected with the supported end of the arm 13 and cantilevered outwardly of the column 14 at an angle to the arm 13 is a second arm 15 which mounts at its outer end a vertically movable workpiece manipulating device which is shown in detail in FIGURE 2 of this specification. It will be obvious that when both the expander assembly carried by arm 13 and the workpiece manipulating assembly carried by arm 15 are sufficiently retracted vertically the whole assembly of the arms 13 and 15 and the parts carried thereby may be swung about the vertical axes of the column 14 to move the expander away from the die while bringing the manipulator into alignment with the die, or vice versa.

Referring now to FIGURE 2, the workpiece manipulator is carried, in depending relation, by a frame 16 movable vertically by a double-acting cylinder 17 mounted on the outer free end of the arm 15, guide rods 18 being provided to guide the vertical movement of the manipulator. Pivotally connected to the underside of the frame 16 as at 19 are a plurality, preferably four, of bellcrank levers having downwardly extending clamping tines 20 and integral inwardly directed operating arms 21. The inner extremities of the arms 21 are ball-shaped, as shown, and fit within an annular race of an operating ferrule 22 which is guided and vertically slideable in a lower horizontal plate or disk 23 making up the part of the frame 16. Ferrule 22 is biased to lower position by a number of circumferentially spaced springs, one of which is shown at 24 in FIGURE 2.

Carried by the upper end portion of frame 16 is a double-acting cylinder 25 having a connected rod 26 which slideably extends down through the ferrule 22 and which carries at its lower end the horizontally disposed disk 27. Pivotally connected to the outer peripheral portion of the disk 27 at circumferentially spaced points substantially coincident with the circumferential locations of the tines 20 are the links 28. The outer ends of these links 28 are pivotally connected to depending fingers 29 which in turn are pivotally connected at their upper ends to the underpart of the frame 16 adjacent the pivot points 19. The fingers 29 overlie the tines 20 in the radial outward direction to thus form clamps for engaging portions of the upper ends of the cylindrical blanks to be handled. One such blank is shown in the drawing at 30. For a purpose to be later described, the radial outer surfaces of the fingers 29 are indented as shown at 31.

Considering now the operation of the complete apparatus, and particularly the portion thereof dealing with the handling of the unfinished and finished workpieces it should be noted that if the cylinder 25 is actuated in an upward direction the ferrule 22 will be raised and the tines 20 will be swung inward into the position shown in dotted lines in FIGURE 2. With the workpiece 30 stopped on a conveyor, not shown herein, in proper position, downward movement of the frame 16 will cause the tines 20 and the fingers 29 to fit over the upper edge of the workpiece, the fingers 29 having inclined surfaces 32 to facilitate such movement. Upon reversal of actuation of cylinder 25 the ferrule 22 will descend under action of the springs 24 until an adjusting nut 33 mounted on the thimble 22 contacts the plate 23 which limits the outward movement of the tines 20, placing them in vertical contact with the inner surface of the blank 30. Continued downward movement of the rod 26 by the cylinder 25 now clamps the fingers 29 tightly onto the outer surface of the blank opposite the upper portions of the tines 20 and the blank is thus securely gripped around its upper edge at a number of circumferentially spaced points.

It will be obvious, of course, that the above described descent of the frame 16 and the clamping onto the cylindrical blank 30 will take place simultaneously with the descent of the expander-forming assembly (carried by arm 13) into the annular die housed within block 10 above mentioned. After completion of the forming cycle and opening of the die, as disclosed in the aforementioned copending application, the assemblies carried by the arms 13 and 15 may be simultaneously raised and then the arms swung to place the radial axis of arm 15 into the position previously occupied by the radial axis of arm 13. Thereafter, the cylinder 17 is actuated to lower the new blank 30 into the previously expanded workpiece 30' which at this state of the cycle is yet within the annular die. The expanded workpiece may have and does commonly have an inwardly directed protuberance such as shown at 30" in FIGURE 2 so that upon upward actuation of the cylinder 25 the properly formed indentations of the fingers 29, such as shown at 31 herein, may engage such protuberances while the tines 20 are being swung inwardly into the position shown in dotted lines in FIGURE 2. Thereafter, upward movement of the frame 16 by reverse actuation of the cylinder 17 withdraws the completed workpiece 30' from the forming die while allowing the new workpiece blank 30 to remain in the die. Upon sufficient retraction for adequate clearance the arms 13 and 15 and the mechanisms carried by their outer free ends may be swung back to their original positions wherein the expander may enter the new workpiece in the die and the previously completed workpiece deposited on a suitable conveyor for being transferred away while the next succeeding new blank is brought into proper position for being engaged by the transfer mechanism shown in FIGURE 2.

It should now be apparent that I have provided an improved arrangement for loading and unloading cylindrical sheet metal workpieces into and out of an expanding die which is raised and trouble free in operation, wholly practical in construction and operation, and capable for being controlled in a substantially automatic manner for achieving a high rate of production. It will be understood, of course, that a suitable sequencing control, not disclosed herein, is employed in the commercial embodiment of the invention to achieve the automatic progression of the actuation of the components through the complete operative cycle generally described above. Since each cycle results in the placement of a new blank and the withdrawal of a formed or completed blank or object the required sequence of movements of the parts is kept to a minimum to slow down the reciprocation of the parts while yet achieving high rates of production. In actual practice as when, for example, the machine is to produce washing machine tubs it will be appreciated that the parts requiring reciprocation are rather large and heavy, lending added utility to the above outlined simplification of sequential and reciprocative movement.

While I have shown the workpiece carrier as being mounted on the outer free end of a swinging arm and have indicated that the expanding mechanism is carried by the outer free end of a second swinging arm, it should be understood that the basic function of interposing the positions of these parts with respect to the die could as well be accomplished by other mechanical arrangements. For example, the workpiece manipulator and the expander could be readily mounted, along with their raising and lowering devices, on a reciprocating slide whereby when in upper positions the slide can be actuated to move the expander away from the die and bring the loaded manipulator into alignment therewith or, alternatively, to move the manipulator back to a conveyor while the expander is brought into alignment with the die.

Also, while the above specification indicates that a bladder or expanding sleeve-type of expander is preferred, it should be understood that the principles of the present invention are equally applicable for use with other kinds of expanders, including those of the mechanical or segmented die type.

Having thus described my invention what I claim is:

1. A loading and unloading mechanism for a machine which expands a sheet metal cylindrical blank by the actuation of an expanding mechanism which enters the blank axially and expands the same against an annular die the combination of interconnected and angularly related cantilevered arms one of which mounts the expanding mechanism at its outer free end, means mounting said arm for swinging movement about an axis parallel with and spaced from the longitudinal axis of said die, and a reciprocating workpiece manipulator carried by the outer free end of the other of said arms and movable along the path generally parallel with said axis to engage one axial end of a workpiece to load and unload the workpiece into and out of said die when the arms are swung to move said expanding mechanism laterally away from the die.

2. Apparatus according to claim 1 further characterized in that said manipulator includes axially extending and radially movable clamping tines which engage the inner surface of an unformed blank and cooperating axially extending and radially movable clamping fingers which may alternatively engage the outer surface of an unformed blank and the inner surface of a formed workpiece in the die, the arrangement being such that in a single cycle of operation which includes the axial movement of said tines and fingers into and out of said annular die an unformed blank or workpiece is deposited in the die while the previously expanded workpiece is immediately thereafter retracted axially from the die.

3. Apparatus according to claim 2 further characterized in that said manipulator includes a frame and in that said tines are elongated portions of bellcrank-like levers which are pivotally mounted on said frame in circumferentially spaced relation, said portions extending generally parallel with said axes and said levers having other portions which extend radially inward toward the longitudinal axis of said die, and said manipulator further including an axially reciprocal member which engages the inner ends of said other portions of said levers to rock said levers whereby said tines are moved radially inward and outward with respect to the inner surface of a workpiece.

4. Apparatus according to claim 3 further characterized in that the means to engage one axial end of a workpiece includes a plurality of axially extending fingers which are pivotally mounted on said frame adjacent the pivotal mountings for said levers, and said manipulator further including operating means connected with said fingers to rock the same radially inward into engagement with the outer surface of a workpiece while said tines move radially outward into engagement with the inner surface of the workpiece, the fingers and the tines constituting clamps for gripping an end portion of the workpiece.

5. Apparatus according to claim 4 further characterized in that said fingers are formed with indentations in their radially outward surfaces, and said indentations being adapted to be received over protuberances formed in the workpieces during the working thereof, the arrangement being such that outward movement of said fingers following the deposition of an unworked workpiece in said annular die said fingers are operative to engage and withdraw a previously formed workpiece axially from said annular die.

6. A loading and unloading mechanism for a machine which expands a sheet metal cylindrical blank by the actuation of an expanding mechanism which enters the blank axially and expands the same against an annular die the combination of a support and means thereon for carrying the expanding mechanism and for moving said mechanism axially into and out of said annular die, a workpiece manipulator, means mounting said manipulator on said support in spaced relation to said expanding mechanism for movement along or parallel to said axis whereby a workpiece grasped by said manipulator may be moved into and out of said die, and means to move said support whereby said expanding mechanism when retracted from the die may be moved to one side of the principle axis of said die while said manipulator and workpiece loaded thereon is moved toward said axis.

7. Apparatus according to claim 6 further characterized in that said manipulator includes axially extending and radially movable clamping tines which engage the inner surface of an unformed blank and cooperating axially extending and radially movable clamping fingers which may alternatively engage the outer surface of an unformed blank and the inner surface of a formed workpiece in the die, the arrangement being such that in a single cycle of operation which includes the axial movement of said tines and fingers into and out of said annular die and unformed blank or workpiece is deposited in the die while the previously expanded workpiece is immediately thereafter retracted from the die.

8. Apparatus according to claim 7 further characterized in that said manipulator includes a frame and in that said tines are elongated portions of bellcrank-like levers which are pivotally mounted on said frame in circumferentially spaced relation, said portions extending generally parallel with said axes and said levers having other portions which extend radially inward toward the longitudinal axis of said die, and said manipulator further including an axially reciprocal member which engages the inner ends of said other portions of said levers to rock said levers whereby said tines are moved radially inward and outward with respect to the inner surface of a workpiece.

9. Apparatus according to claim 8 further characterized in that the means to engage one axial end of a workpiece includes a plurality of axially extending fingers which are pivotally mounted on said frame adjacent the pivotal mountings for said levers, and said manipulator further including operating means connected with said fingers to rock the same radially inward into engagement with the outer surface of a workpiece while said tines move radially outward into engagement with the inner surface of the workpiece, the fingers and the tines constituting clamps for gripping an end portion of the workpiece.

10. Apparatus according to claim 9 further characterized in that said fingers are formed with indentations in their radially outward surfaces, and said indentations being adapted to be received over protuberances formed in the workpieces during the working thereof, the arrangement being such that outward movent of said fingers following the deposition of an unworked workpiece in said annular die said fingers are operative to engage and withdraw a previously formed workpiece axially from said annular die.

References Cited
UNITED STATES PATENTS

| | | | |
|---|---|---|---|
| 2,962,994 | 12/1960 | Wheelon | 72—419 |
| 3,040,684 | 6/1962 | Hillgren | 113—113 |
| 3,080,840 | 3/1963 | De Man | 113—113 |

RICHARD J. HERBST, *Primary Examiner.*